US008628872B2

(12) United States Patent
Koetting et al.

(10) Patent No.: US 8,628,872 B2
(45) Date of Patent: Jan. 14, 2014

(54) BATTERY CELL ASSEMBLY AND METHOD FOR ASSEMBLING THE BATTERY CELL ASSEMBLY

(75) Inventors: William Koetting, Davisburg, MI (US); Kwok Tom, Madison Heights, MI (US); Martin J. Klein, Grosse Pointe Park, MI (US); Prabhakar Patil, Southfield, MI (US); Kelly Kebl, Berkley, MI (US)

(73) Assignee: LG Chem, Ltd., Seoul (KR)

( * ) Notice: Subject to any disclaimer, the term of this patent is extended or adjusted under 35 U.S.C. 154(b) by 624 days.

(21) Appl. No.: 12/016,630

(22) Filed: Jan. 18, 2008

(65) Prior Publication Data

US 2009/0186265 A1 Jul. 23, 2009

(51) Int. Cl.
| H01M 2/00 | (2006.01) |
| H01M 2/02 | (2006.01) |
| H01M 2/04 | (2006.01) |
| H01M 2/10 | (2006.01) |
| H01M 2/14 | (2006.01) |
| H01M 2/16 | (2006.01) |
| H01M 2/18 | (2006.01) |
| H01M 10/50 | (2006.01) |

(52) U.S. Cl.
USPC ............................ 429/120; 429/149; 429/163

(58) Field of Classification Search
None
See application file for complete search history.

(56) References Cited

U.S. PATENT DOCUMENTS

| 2,273,244 | A | * | 2/1942 | Ambruster ...................... 429/71 |
| 3,503,558 | A | | 3/1970 | Galiulo et al. |
| 3,522,100 | A | * | 7/1970 | Lindstrom ...................... 429/26 |
| 4,390,841 | A | | 6/1983 | Martin et al. |
| 5,071,652 | A | * | 12/1991 | Jones et al. ...................... 429/101 |
| 5,270,131 | A | * | 12/1993 | Diethelm et al. ............... 429/34 |
| 5,346,786 | A | | 9/1994 | Hodgetts |
| 5,354,630 | A | | 10/1994 | Earl et al. |
| 5,385,793 | A | | 1/1995 | Tiedemann et al. |

(Continued)

FOREIGN PATENT DOCUMENTS

| CN | 1512518 A | 7/2004 |
| EP | 0736226 B1 | 3/1999 |

(Continued)

OTHER PUBLICATIONS

"A Review of Cell Equalization Methods for Lithium Ion and Lithium Polymer Battery Systems" Stephen W. Moore and Peter J. Schneider; 2001 Society of Automotive Engineers; Jan. 2001; pp. 1-5.

(Continued)

*Primary Examiner* — Melvin C Mayes
*Assistant Examiner* — Colin W Slifka
(74) *Attorney, Agent, or Firm* — Buckert Patent & Trademark Law Firm, P.C.; John F. Buckert (57) ABSTRACT

A battery cell assembly and a method for assembling the battery cell assembly are provided. The battery cell assembly includes first and second battery cells with a heat exchanger disposed between the first and second battery cells. The heat exchanger has a plastic frame and first and second thermally conductive layers. The plastic frame has an interior space extending therethrough. The first and second thermally conductive layers are disposed on opposite sides of the plastic frame to enclose the interior space, such that when a liquid is disposed in the interior space, heat energy is transferred from the first battery cell through the first thermally conductive layer to the liquid.

15 Claims, 6 Drawing Sheets

(56) References Cited

U.S. PATENT DOCUMENTS

| | | | |
|---|---|---|---|
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,606,242 A | 2/1997 | Hull et al. | |
| 5,652,502 A | 7/1997 | van Phuoc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | van Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,257,328 B1 | 7/2001 | Fujiwara et al. | |
| 6,353,815 B1 | 3/2002 | Vilim et al. | |
| 6,413,678 B1 | 7/2002 | Hamamoto et al. | |
| 6,422,027 B1 | 7/2002 | Coates, Jr. et al. | |
| 6,441,586 B2 | 8/2002 | Tate, Jr. et al. | |
| 6,448,741 B1 | 9/2002 | Inui et al. | |
| 6,462,949 B1 * | 10/2002 | Parish et al. | 361/699 |
| 6,515,454 B2 | 2/2003 | Schoch | |
| 6,534,954 B1 | 3/2003 | Plett | |
| 6,563,318 B2 | 5/2003 | Kawakami et al. | |
| 6,689,510 B1 * | 2/2004 | Gow et al. | 429/149 |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,479,758 B2 | 1/2009 | Moon | |
| 2001/0030069 A1 * | 10/2001 | Misu et al. | 180/68.1 |
| 2001/0035739 A1 | 11/2001 | Laig-Horstebrock et al. | |
| 2002/0130637 A1 | 9/2002 | Schoch | |
| 2002/0169581 A1 | 11/2002 | Sarfert | |
| 2003/0008205 A1 * | 1/2003 | Horie et al. | 429/120 |
| 2003/0052690 A1 | 3/2003 | Schoch | |
| 2003/0184307 A1 | 10/2003 | Kozlowski et al. | |
| 2004/0000892 A1 | 1/2004 | Jae-Seung | |
| 2004/0032264 A1 | 2/2004 | Schoch | |
| 2004/0189257 A1 | 9/2004 | Dougherty et al. | |
| 2005/0001627 A1 | 1/2005 | Anbuky et al. | |
| 2005/0026014 A1 | 2/2005 | Fogaing et al. | |
| 2005/0035742 A1 | 2/2005 | Koo et al. | |
| 2005/0046388 A1 | 3/2005 | Tate, Jr. et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2007/0035307 A1 | 2/2007 | Schoch | |
| 2007/0037051 A1 | 2/2007 | Kim et al. | |
| 2007/0046292 A1 | 3/2007 | Plett | |
| 2007/0103120 A1 | 5/2007 | Plett | |
| 2007/0120533 A1 | 5/2007 | Plett | |
| 2007/0126396 A1 | 6/2007 | Yang | |
| 2007/0188143 A1 | 8/2007 | Plett | |
| 2007/0236182 A1 | 10/2007 | Plett | |
| 2008/0094035 A1 | 4/2008 | Plett | |
| 2009/0029239 A1 | 1/2009 | Koetting et al. | |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325059 A1 | 12/2009 | Niedzwiecki et al. | |
| 2010/0203376 A1 * | 8/2010 | Choi et al. | 429/120 |

FOREIGN PATENT DOCUMENTS

| | | |
|---|---|---|
| EP | 0673553 B1 | 2/2001 |
| EP | 1435675 A1 | 7/2004 |
| EP | 1 577 966 A2 | 9/2005 |
| EP | 1 852 925 A1 | 11/2007 |
| JP | 4056079 A | 2/1992 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2003219572 A | 7/2003 |
| JP | 2005-126315 | 5/2005 |
| JP | 2008-080995 | 4/2008 |
| WO | 2007/007503 A1 | 1/2007 |

OTHER PUBLICATIONS

"Advances in EKF SOC Estimation for LiPB HEV Battery Packs" Gregory L. Plett; Powering Sustainable Transportation EVS 20; Nov. 15-19, 2003; Long Beach, California; pp. 1-12.

"An Introduction to the Kalman Filter" Greg Welch and Gary Bishop; SIGGRAPH 2001 Course 8; Los Angeles, California; Aug. 12-17, 2001; http://info.acm.org/pubs/toc/CRnotice.html; pp. 1-80.

"Dual Extended Kalman Filter Methods" Eric A. Wan and Alex T. Nelson; Kalman Filtering and Neural Networks; 2001; pp. 123-173.

"Estimation from Lossy Sensor Data: Jump Linear Modeling and Kalman Filtering" A.K. Fletcher, S. Rangen, V.K. Goyal; IPSN Apr. 26-27, 2004; Berkeley, California; pp. 251-258.

"Extended Kalman Filtering for Battery Management Systems of LiPB-based HEV Battery Packs—Part 1 Background" Gregory L. Plett; Journal of Power Sources 134; 2004; pp. 252-261; no month.

"Extended Kalman Filtering for Battery Management Systems of LiPB-based HEV Battery Packs—Part 2 Modeling and Identification" Gregory L. Plett; Journal of Power Sources 134; 2004; pp. 262-276; no month.

"Extended Kalman Filtering for Battery Management Systems of LiPB-based HEV Battery Packs—Part 3 State and Parameter Estimation" Gregory L. Plett; Journal of Power Sources 134; 2004; pp. 277-283; no month.

"Kalman-Filter SOC Estimation for LiPB HEV Cells" Gregory L. Plett; The 19th International Battery, Hybrid and Fuel Electric Vehicle Symposium and Exhibition; Oct. 19-23, 2002; Busan, Korea: pp. 1-12.

"LiPB Dynamic Cell Models for Kalman-Filter SOC Estimation" Gregory L. Plett; The 19th International Battery, Hybrid and Fuel Electric Vehicle Symposium and Exhibition; Oct. 19-23, 2002; Busan, Korea: pp. 1-12.

(56) References Cited

OTHER PUBLICATIONS

"Recursive Parameter Estimation" S.C. Rutan; Journal of Chemometrics, vol. 4, 102-121 (1990).

"Support Vector based Battery sate of charge Estimator" T. Hansen, C. Wang; Journal of Power Sources, 2004; 6391; pp. 1-8.

International Search Report for PCT/KR2009/000258 dated Aug. 28, 2009.

Chinese Office Action dated Dec. 7, 2007 for Chinese Patent Application No. 200480025941.5 (PCT/KR2004/002399).

European Supplementary Search Report dated Aug. 28, 2009 for EP Application No. 04774658.

Machine translation of JP 08-138735.

Machine translation of JP 10-199510.

Machine translation of JP 2000 260469.

U.S. Appl. No. 12/246,073, filed Oct. 6, 2008 entitled Battery Cell Assembly and Method for Assembling the Battery Cell Assembly.

U.S. Appl. No. 12/426,795, filed Apr. 20, 2009 entitled Frame Member, Frame Assembly and Battery Cell Assembly Made Therefrom and Methods of Making the Same.

U.S. Appl. No. 12/433,155, filed Apr. 30, 2009 entitled Cooling System for a Battery System and a Method for Cooling the Battery System.

U.S. Appl. No. 12/433,397, filed Apr. 30, 2009 entitled Battery Systems, Battery Modules, and Method for Cooling a Battery Module.

U.S. Appl. No. 12/433,427, filed Apr. 30, 2009 entitled Cooling Manifold and Method for Manufacturing the Cooling Manifold.

U.S. Appl. No. 12/433,485, filed Apr. 30, 2009 entitled Battery Systems, Battery Module, and Method for Cooling the Battery Module.

U.S. Appl. No. 12/433,534, filed Apr. 30, 2009 entitled Battery Systems, Battery Modules, and Method for Cooling a Battery Module.

U.S. Appl. No. 12/511,530, filed Jul. 29, 2009 entitled Battery Module and Method for Cooling the Battery Module.

U.S. Appl. No. 12/511,552, filed Jul. 29, 2009 entitled Battery Module and Method for Cooling the Battery Module.

U.S. Appl. No. 12/549,766, filed Aug. 28, 2009 entitled Battery Module and Method for Cooling the Battery Module.

\* cited by examiner

BATTERY CELL ASSEMBLY AND METHOD FOR ASSEMBLING THE BATTERY CELL ASSEMBLY

BACKGROUND

Battery cells have been developed to supply electrical power to devices. A problem associated with the battery cells, however, is that the battery cells can generate heat which can degrade the battery cells over time. Accordingly, the inventors herein have recognized a need for a battery cell assembly that reduces and/or minimizes the foregoing deficiency.

SUMMARY

A battery cell assembly in accordance with an exemplary embodiment is provided. The battery cell assembly includes a first battery cell having a first side and a second side opposite the first side. The battery cell assembly further includes a first panel member configured to contact at least a portion of the first side of the first battery cell. The battery cell assembly further includes a heat exchanger having a plastic frame and first and second thermally conductive layers. The plastic frame has an interior space extending therethrough. The plastic frame has a third side and a fourth side opposite the third side. The first thermally conductive layer is disposed on the third side of the plastic frame and covers the interior space. The second thermally conductive layer is disposed on the fourth side of the plastic frame and covers the interior space. The first thermally conductive layer is disposed adjacent the second side of the first battery cell, such that when a liquid is disposed in the interior space, heat energy is transferred from the first battery cell through the first thermally conductive layer to the liquid.

A method for assembling a battery cell assembly in accordance with another exemplary embodiment is provided. The battery cell assembly has a first battery cell with a first side and a second side opposite the first side, a first panel member, and a heat exchanger having a plastic frame and first and second thermally conductive layers. The plastic frame has an interior space extending therethrough. The plastic frame has a third side and a fourth side opposite the third side. The method includes disposing the first panel member on at least a portion of the first side of the first battery cell. The method further includes disposing the first thermally conductive layer on the third side of the plastic frame and covering the interior space. The method further includes disposing the second thermally conductive layer on the fourth side of the plastic frame and covering the interior space. The method further includes disposing the first battery cell on the first thermally conductive layer of the heat exchanger to obtain the battery cell assembly.

DETAILED DESCRIPTION OF EXEMPLARY EMBODIMENTS

Figure 1:
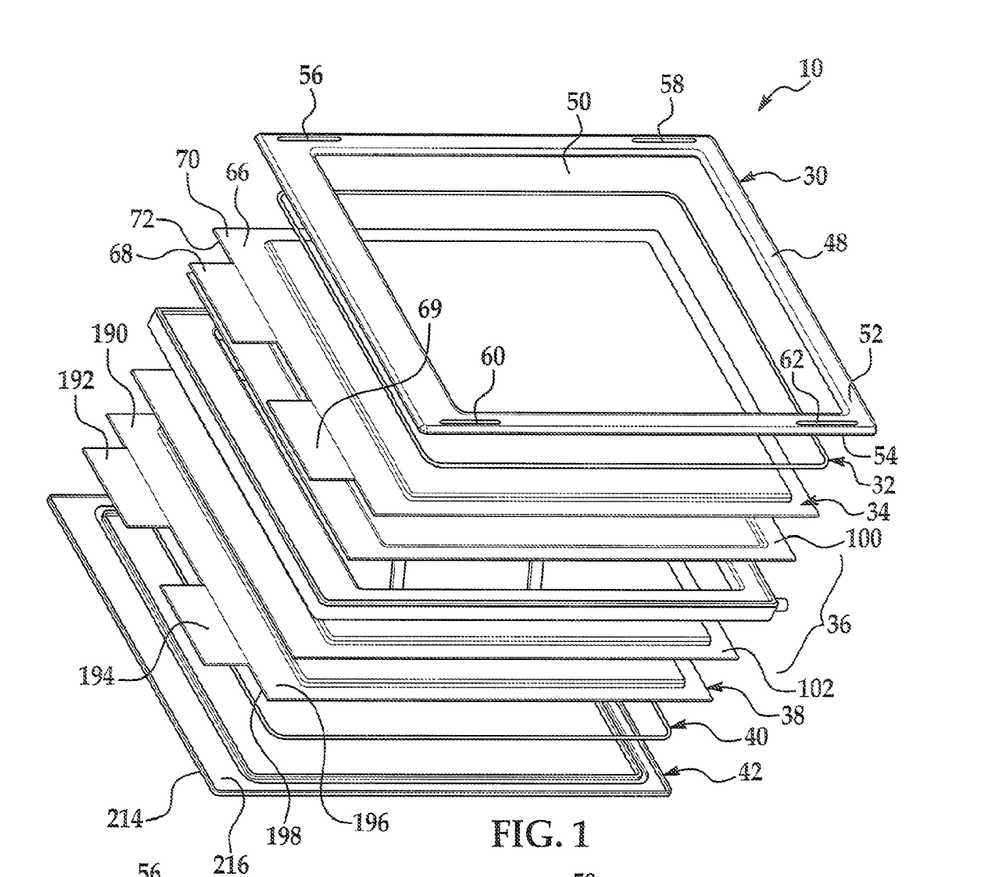
FIG. 1 is an exploded schematic of a battery cell assembly in accordance with an exemplary embodiment.

Referring to FIG. 1, a battery cell assembly 10 is illustrated. The battery cell assembly 10 includes a panel member 30, a grommet 32, a battery cell 34, a heat exchanger 36, a battery cell 38, a grommet 40, and a panel member 42. An advantage of the battery cell assembly 10 is that the battery cell assembly 10 includes a heat exchanger 36 with thermally conductive layers to remove heat from the battery cells 34, 38.

Figure 2:
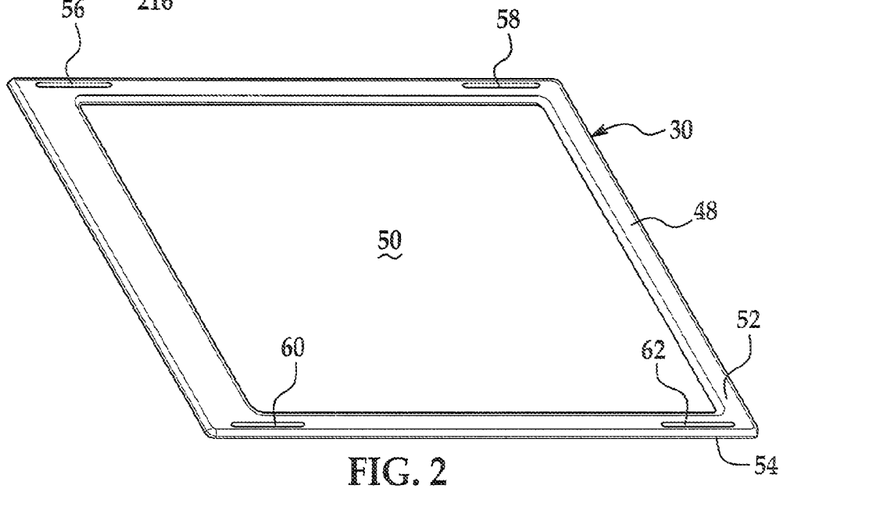
FIG. 2 is a schematic of a first panel member utilized in the battery cell assembly of FIG. 1.
Figure 3:
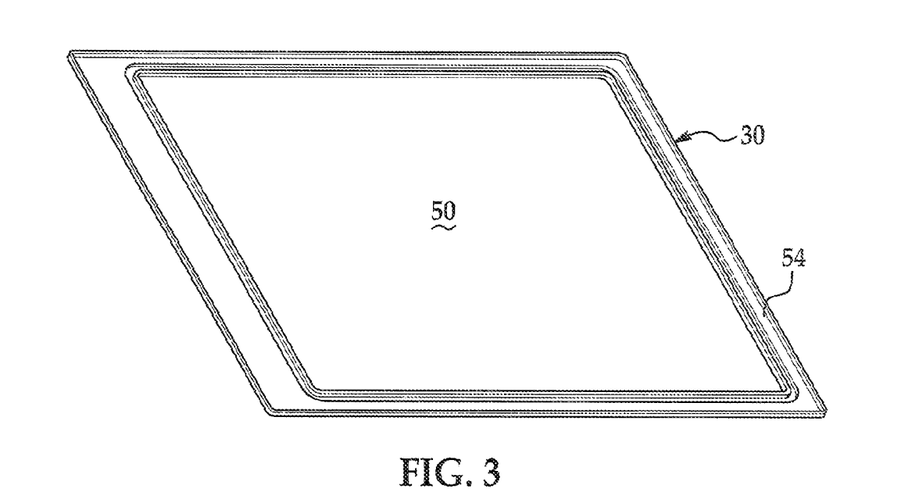
FIG. 3 is another schematic of the first panel member utilized in the battery cell assembly of FIG. 1.

Referring to FIGS. 1-3, the panel member 30 is configured to hold the battery cell 34 against the heat exchanger 36. The panel member 30 includes a rectangular ring-shaped frame 48 that defines an interior space 50. The panel member 30 has a side 52 and a side 54 opposite the side 52. The panel member 30 further includes apertures 56, 58, 60, 62 extending into the side 52 for receiving portions of fasteners (not shown). In one exemplary embodiment, the panel member 30 is constructed from plastic. In other alternative embodiments, the panel member 30 can be constructed from other materials known to those skilled in the art.

The grommet 32 is configured to apply a holding force against the battery cell 34. The grommet 32 is disposed between the panel member 30 and the battery cell 32. The grommet 32 is generally rectangular ring-shaped and is constructed of a pliable material such as a rubber compound.

Figure 6:
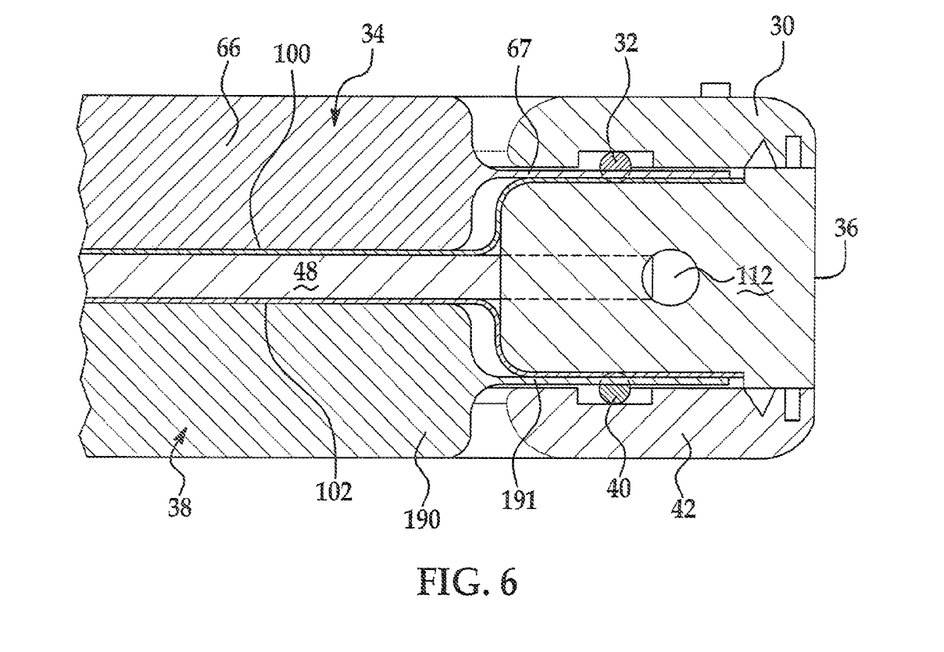
FIG. 6 is a cross-sectional schematic of a portion of the battery cell assembly of FIG. 1.

Referring to FIGS. 1 and 6, the battery cell 34 is provided to output an operational voltage between the electrical terminals 68, 69. The battery cell 34 includes a body portion 66 and a peripheral lip portion 67 extending around the body portion 66, and electrical terminals 68, 69 extending from the body portion 66. The battery cell 34 is generally rectangular shaped and includes a first side 70 and a second side 72 opposite the first side 70. In one exemplary embodiment, the battery cell 34 is a lithium battery cell. Of course, in alternative embodiments, the battery cell 34 can comprise other types of battery cells known to those skilled in the art. The size of the peripheral lip portion 67 is substantially equal to a size of the panel member 30 such that the panel member 30 covers the peripheral lip portion 67 of the battery cell 34. The battery cell 34 is disposed between the panel member 30 and the heat exchanger 36.

Figure 4:
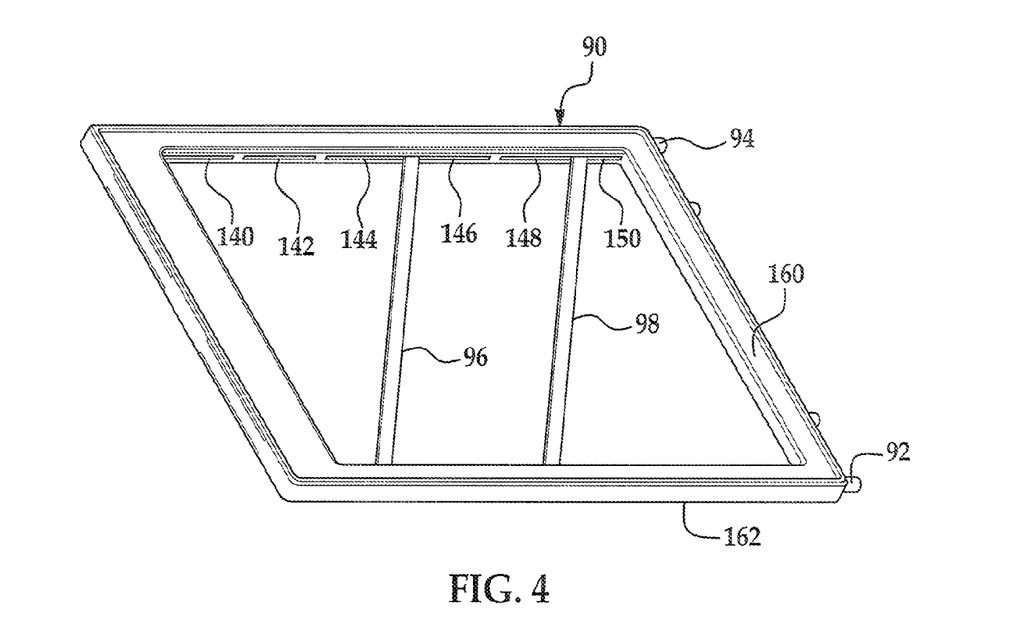
FIG. 4 is a schematic of a portion of the heat exchanger utilized in the battery cell assembly of FIG. 1.
Figure 5:
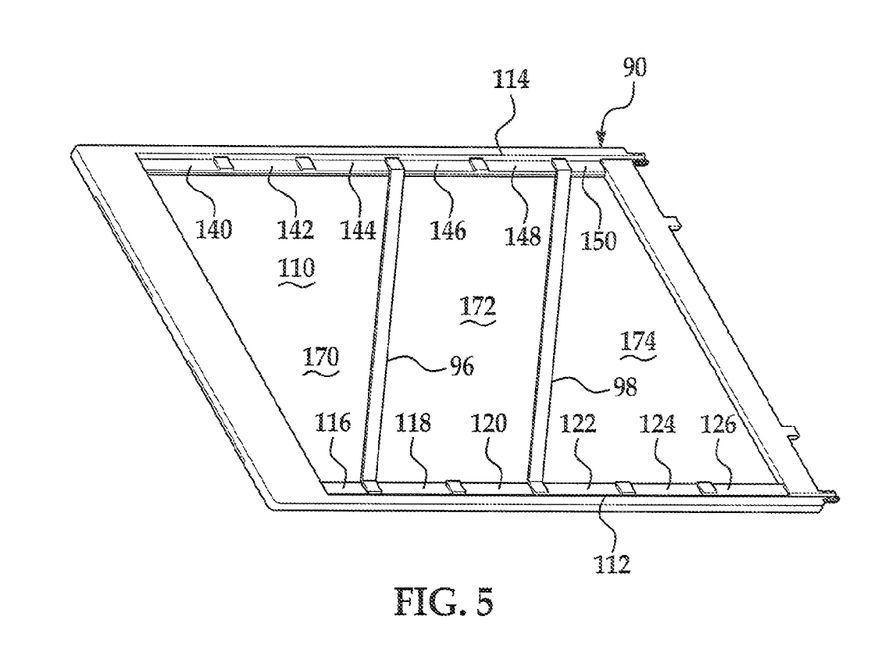
FIG. 5 is a cross-sectional schematic of a portion of the heat exchanger of FIG. 4.

Referring to FIGS. 1, 4 and 5, the heat exchanger 36 is provided to remove heat from the battery cells 34, 38. The heat exchanger 36 is disposed between the battery cell 34 and the battery cell 38. The heat exchanger 36 includes a rectangular ring-shaped frame 90, an inlet port 92, an outlet port 94, cross-members 96, 98 and thermally conductive layers 100, 102. It should be noted that cross-members 96, 98 are optional.

The rectangular ring-shaped frame 90 is provided to define an interior space 110 for receiving a liquid therein. The rectangular ring-shaped frame 90 has a third side 160 and a fourth side 162 opposite the third side 160. The rectangular ring-shaped frame 90 further includes elongated apertures 112, 114 extending therein. The elongated aperture 112 extends from the inlet port 92 along a first portion of the rectangular ring-shaped frame 90 and fluidly communicates with apertures 116, 118, 120, 122, 124, 126 that fluidly communicate with the interior space 110. The elongated aperture 114 extends from the outlet port 94 along a second portion of the rectangular ring-shaped frame 90 and fluidly communicates with apertures 140, 142, 144, 146, 148, 150 that fluidly communicate with the interior space 110. In one exemplary embodiment, the rectangular ring-shaped frame 90 is constructed from plastic. Of course, in alternative embodiments, the rectangular ring-shaped frame 90 can be constructed from other materials known to those skilled in the art.

The cross-members 96, 98 are disposed across the interior space 110 and are coupled to first and second portions of the rectangular ring-shaped frame 90 to partition the interior space 110 into regions 170, 172, and 174. The cross-members 96, 98 are utilized to guide a flow of liquid coolant within the interior space 110 to even out heat exchange across the heat exchanger surfaces. In one exemplary embodiment, the cross-members 96, 98 are constructed from plastic. Of course, in alternative embodiments, the cross-members 96, 98 can be constructed from other materials known to those skilled in the art.

The inlet port 92 is configured to receive a liquid into route the liquid through the elongated aperture 112 to the apertures 116, 118, 120, 122, 124 and 126. The inlet port 92 is coupled to a first portion of the rectangular ring-shaped frame 90. In alternative embodiments, the inlet port 92 can be located anywhere along the perimeter of the frame 90.

The outlet port 94 is configured to receive the liquid from the interior space 110 via the apertures 140, 142, 144, 146, 148, 150 and the elongated aperture 114. The outlet port 94 is coupled to the second portion of the rectangular ring-shaped frame 90.

Referring to FIGS. 1 and 4, the thermally conductive layers 100, 102 are provided to transfer heat from the battery cells 34, 38 into a liquid contained within the interior space 110. The thermally conductive layer 100 is disposed on the third side 160 of the rectangular ring-shaped frame 90. The thermally conductive layer 102 is disposed on the fourth side 162 of the rectangular ring-shaped frame 90. In one exemplary embodiment, the thermally conductive layers 100, 102 are constructed from aluminum. Of course, in alternative embodiments, other materials known to those skilled in the art, such as stainless steel or flexible laminated materials could be utilized to construct the thermally conductive layers 100, 102. In one exemplary embodiment, the thermally conductive layers 100, 102 are glued to the sides 160, 162 of the rectangular ring-shaped frame 90 such that the interior space 110 is enclosed by the thermally conductive layers 100, 102. In an alternative embodiment, the ring-shaped frame 90 can be molded over the thermally conductive layers 100, 102.

During operation of the heat exchanger 36, the inlet port 92 receives a liquid which is routed through the elongated aperture 112 and the apertures 116, 118, 120, 122, 124, 126 into the interior space 110. In the interior space 110, the liquid absorbs heat from the thermally conductive layers 100, 102 and is routed through the apertures 140, 142, 144, 146, 148, 150 into the elongated aperture 114. From the elongated aperture 114, the liquid is routed out the outlet port 94. Thus, heat produced by the battery cells 34, 38 is transferred through the thermally conductive layers 100, 102, respectively, into the liquid which is routed out of the heat exchanger 36. As a result, a temperature of the battery cells 36, 38 is maintained within a desired temperature range utilizing the heat exchanger 36.

Referring to FIGS. 1 and 6, the battery cell 38 is provided to output an operational voltage between the electrical terminals 192, 194. The battery cell 38 includes a body portion 190 and a peripheral lip portion 191 extending around the body portion 190, and the electrical terminals 192, 194 extending from the body portion 190. The battery cell 38 is generally rectangular shaped and includes a fifth side 196 and a sixth side 198 opposite the fifth side 196. In one exemplary embodiment, the battery cell 38 is a lithium battery cell. Of course, in alternative embodiments, the battery cell 384 can comprise other types of battery cells known to those skilled in the art. The size of the peripheral lip portion 191 is substantially equal to a size of the panel member 42 such that the panel member 42 covers the peripheral lip portion 191 of the battery cell 38. The battery cell 38 is disposed between the heat exchanger 36 and the panel member 42.

The grommet 40 is configured to apply a holding force against the battery cell 38. The grommet 40 is disposed between the panel member 42 and the battery cell 38. The grommet 40 is generally rectangular ring-shaped and is constructed of a pliable material such as a rubber compound.

Figure 7:
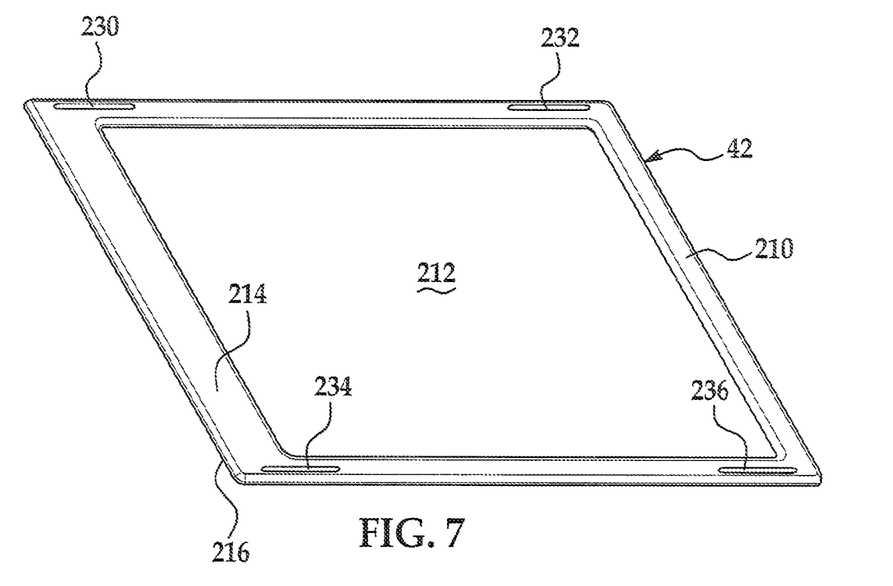
FIG. 7 is a schematic of a second panel member utilized in the battery cell assembly of FIG. 1.
Figure 8:
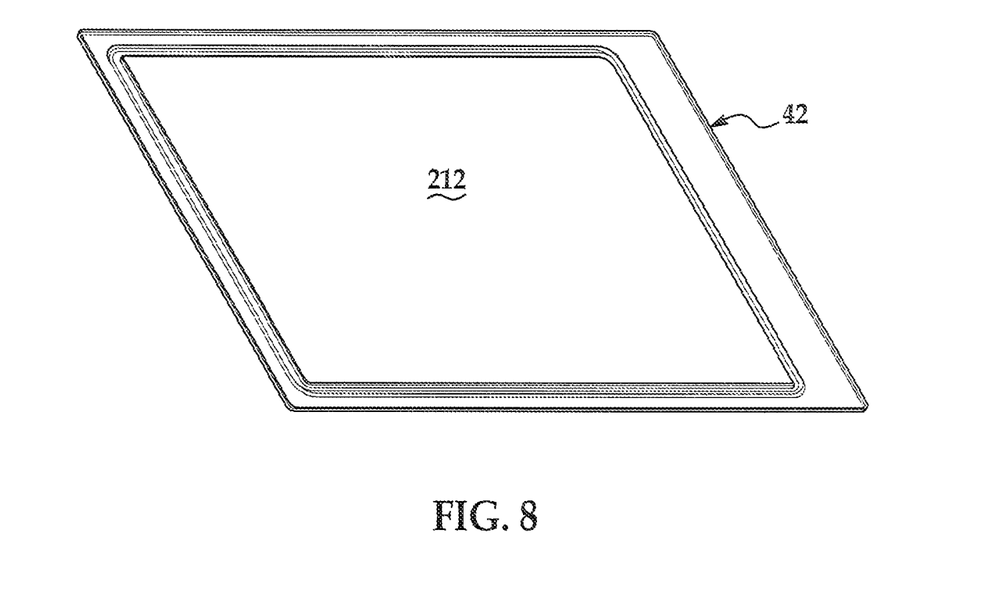
FIG. 8 is another schematic of the second panel member utilized in the battery cell assembly of FIG. 1.

The panel member 42 is configured to hold the battery cell 38 against the heat exchanger 36. The panel member 42 includes a rectangular ring-shaped frame 210 that has an interior space 212. The panel member 42 has a side 214 and a side 216 opposite the side 214. The panel member 42 further includes apertures 230, 232, 234, 236 extending into the side 210 for receiving portions of fasteners (not shown). In one exemplary embodiment, the panel member 42 is constructed from plastic. In other alternative embodiments, the panel member 42 can be constructed from other materials known to those skilled in the art.

Figure 9:
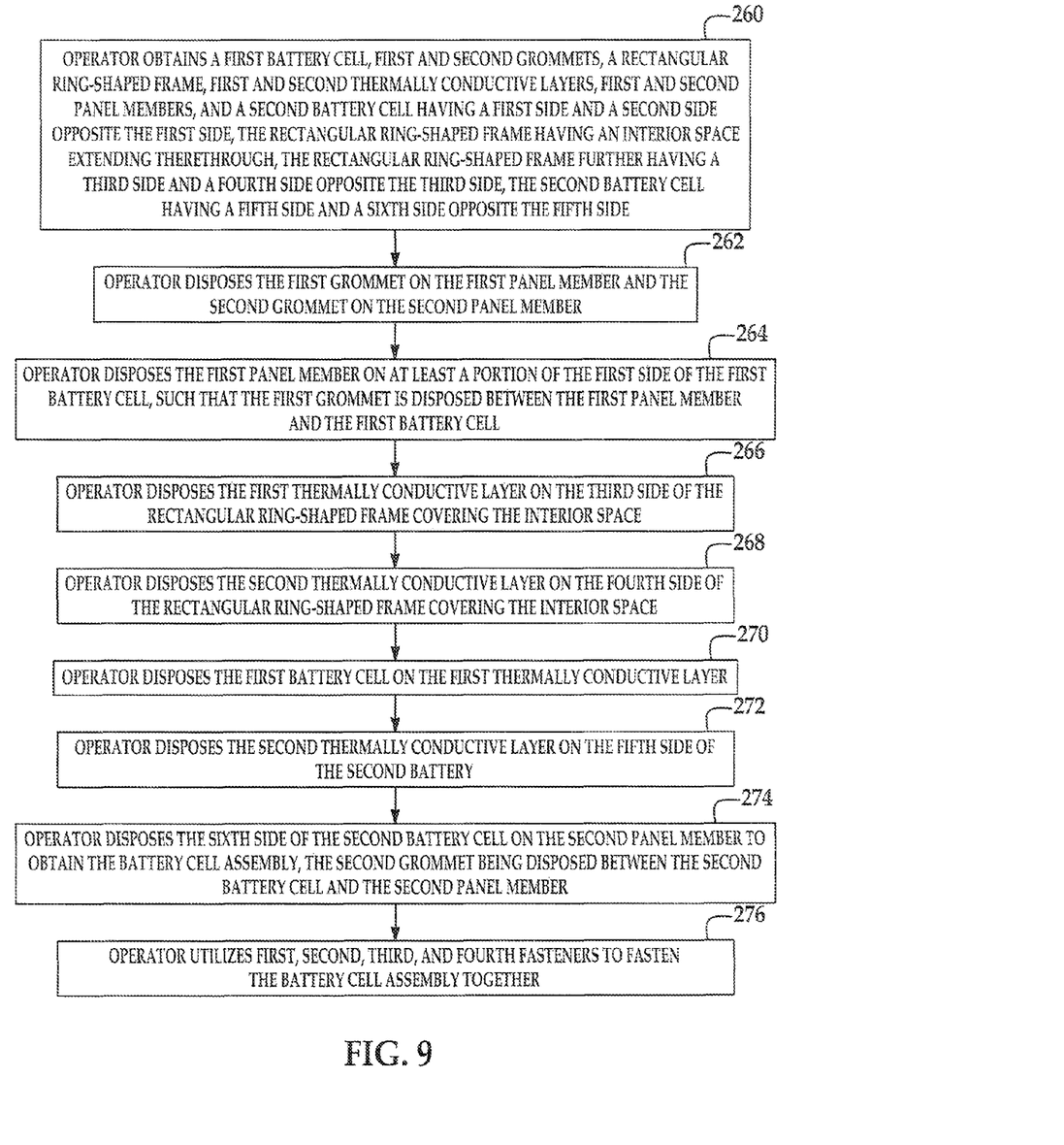
FIG. 9 is a flowchart of a method for assembling the battery cell assembly of FIG. 1.

Referring to FIG. 9, a flowchart of a method for assembling in the battery cell assembly 10 will now be explained.

At step 260, an operator obtains the battery cell 34, grommets 32, 40, the rectangular ring-shaped frame 90, thermally conductive layers 100, 102, panel members 30, 42, and the battery cell 38. The battery cell 34 has the first side 70 and the second side 72 opposite the first side 70. The rectangular ring-shaped frame 90 has the interior space 110 extending therethrough. The rectangular ring-shaped frame 90 further has the third side 160 and the fourth side 162 opposite the third side 160. The battery cell 38 has the fifth side 196 and the sixth side 198 opposite the fifth side 196.

At step 262, the operator disposes the grommet 32 on the panel member 30 and the grommet 40 on the panel member 42.

At step 264, the operator disposes the panel member 30 on at least a portion of the first side 70 of the battery cell 34, such that the grommet 32 is disposed between panel member 30 and the battery cell 34.

At step 266, the operator disposes the thermally conductive layer 100 on the third side 160 of the rectangular ring-shaped frame 90 covering the interior space 110.

At step 268, the operator disposes the thermally conductive layer 102 on the fourth side 162 of the rectangular ring-shaped frame 90 covering the interior space 110.

At step 270, the operator disposes the battery cell 34 on the thermally conductive layer 100.

At step 272, the operator disposes the thermally conductive layer 102 on the side 190 of the battery cell 38.

At step 274, the operator disposes the sixth side 198 of the battery cell 38 on the panel member 42 to obtain the battery cell assembly 10. The grommet 40 is disposed between the battery cell 38 and the panel member 42.

At step 276, the operator utilizes first, second, third, and fourth fasteners to fasten the battery cell assembly 10 together. In particular, the first fastener engages the apertures 56, 234 of the panel assemblies 30, 42, respectively. The second fastener engages the apertures 58, 236 of the panel assemblies 30, 42, respectively. The third fastener engages the apertures 60, 230 of the panel assemblies 30, 42, respectively. Further, the fourth fastener engages the apertures 62, 232 of the panel assemblies 30, 42, respectively.

Figure 10:
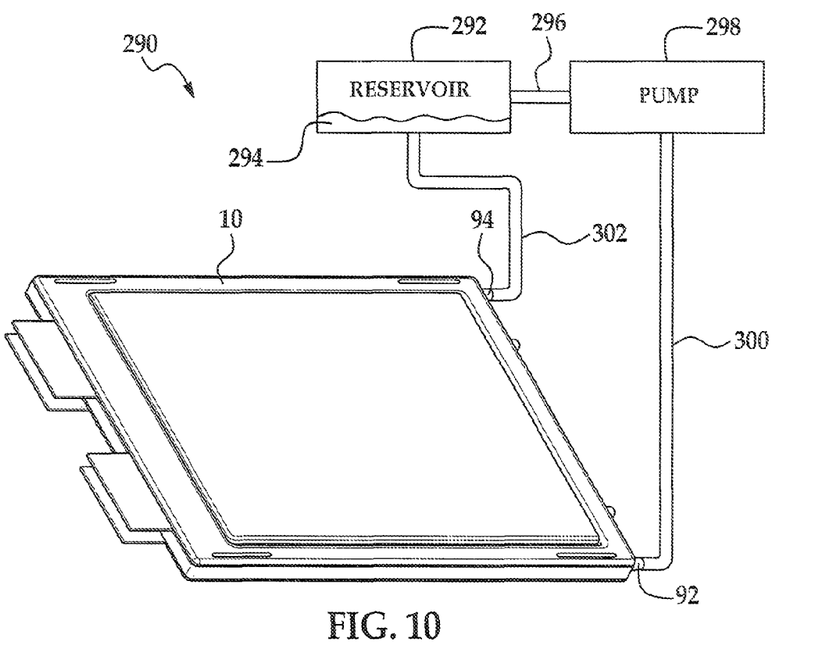
FIG. 10 is a schematic of a coolant system coupled to the battery cell assembly of FIG. 1.

Referring to FIG. 10, a cooling system 290 that is utilized to route liquid through the heat exchanger 36 of the battery cell assembly 10 will now be explained. The cooling system 290 includes a reservoir 292, a conduit 296, a pump 298, and conduits 300, 302. The reservoir 292 is configured to hold a liquid 294 therein. The conduit 296 is fluidly coupled between the reservoir 292 and the pump 298. The conduit 300 is fluidly coupled between the pump 298 and the inlet port 92 of the heat exchanger 36. The pump 298 is configured to pump a portion of the liquid 294 from the reservoir 292 via the conduit 296, through the conduit 300 to the inlet port 92 of the heat exchanger 36. The portion of liquid 294 in the heat exchanger 36 absorbs heat from the battery cells 34, 38 and exits the heat exchanger 36 via the outlet port 94. Thereafter, the portion of liquid 294 is routed through the conduit 302 to the reservoir 292.

Figure 11:
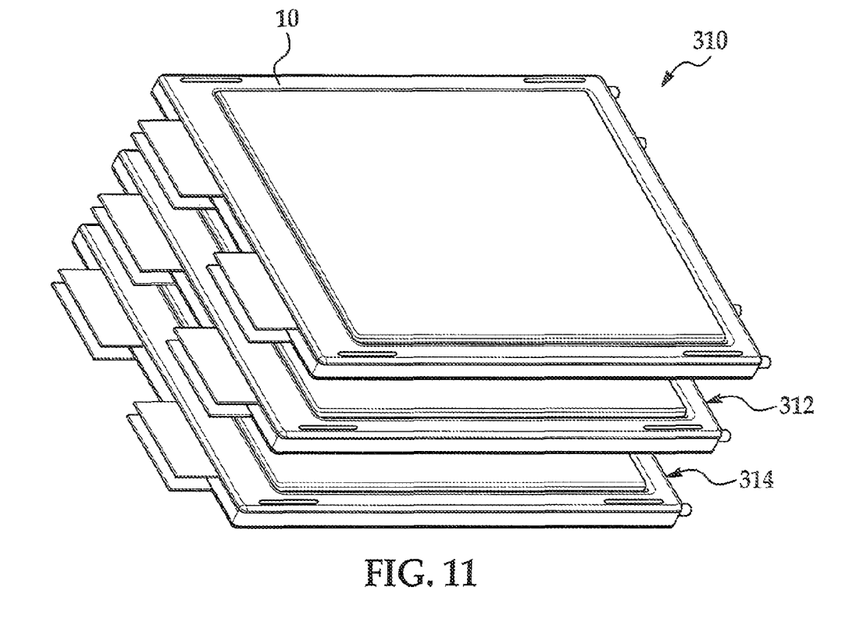
FIG. 11 is a schematic of a battery system including the battery cell assembly of FIG. 1 and two additional battery cell assemblies.

Referring to FIG. 11, a battery system 310 which utilizes a plurality of battery cell assemblies stacked on top of one another is illustrated. As shown, the battery system 310 includes the battery cell assembly 10, a battery cell assembly 312, and a battery cell assembly 314. The battery cell assembly 10 is disposed on top of the battery cell assembly 312. The battery cell assembly 312 is disposed on top of the battery cell assembly 314. It should be noted that although battery system 310 includes three battery cell assemblies, in alternative embodiments, the battery system 310 could include fewer than three battery cell assemblies or greater than three battery cell assemblies.

The battery cell assembly 10 and the method for assembling the battery cell assembly 10 represent a substantial advantage over other assemblies and methods. In particular, the battery cell assembly 10 provides a technical effect of utilizing a heat exchanger 36 with a thermally conductive layer to remove heat from a battery cell disposed adjacent the thermally conductive layer. Thus, a temperature of the battery cell can be maintained within a desired temperature range to prevent degradation of the battery cell.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery cell assembly, comprising:
   a first battery cell having a first side and a second side opposite the first side;
   a first panel member configured to contact at least a portion of the first side of the first battery cell; and
   a heat exchanger having a rectangular ring-shaped plastic frame and first and second thermally conductive layers, the rectangular ring-shaped plastic frame having an interior space extending therethrough, the rectangular ring-shaped plastic frame having a third side and a fourth side opposite the third side, the first thermally conductive layer being disposed on the third side of the rectangular ring-shaped plastic frame and covering the interior space, the second thermally conductive layer being disposed on the fourth side of the rectangular ring-shaped plastic frame and covering the interior space, the first thermally conductive layer being disposed adjacent the second side of the first battery cell, such that when a liquid is disposed in the interior space, heat energy is transferred from the first battery cell through the first thermally conductive layer to the liquid.

2. The battery cell assembly of claim 1, wherein the heat exchanger further includes an outlet port and an inlet port coupled to the rectangular ring-shaped plastic frame, the rectangular ring-shaped plastic frame having a first elongated aperture fluidly communicating with the inlet port and the interior space, the rectangular ring-shaped plastic frame having a second elongated aperture fluidly communicating with the outlet port and the interior space, such that the liquid flows through the inlet port and first elongated aperture into the interior space and then the liquid flows from the interior space through the second elongated aperture to the outlet port.

3. The battery cell assembly of claim 2, wherein the heat exchanger further comprises at least one cross-member that extends across the rectangular ring-shaped plastic frame to partition the interior space into at least first and second interior regions.

4. The battery cell assembly of claim 1, wherein the first thermally conductive layer is constructed from aluminum.

5. The battery cell assembly of claim 1, further comprising:
   a second battery cell having a fifth side and a sixth side opposite the fifth side, the fifth side of the second battery cell being disposed on the second thermally conductive layer, such that when the liquid is disposed in the interior space, heat energy is transferred from the second battery cell through the second thermally conductive layer to the liquid.

6. The battery cell assembly of claim 5, further comprising a second panel member configured to contact at least a portion of the sixth side of the second battery cell.

7. The battery cell assembly of claim 1, wherein the rectangular ring-shaped plastic frame has first, second, third and fourth outer peripheral walls, the first and second outer peripheral walls being parallel to one another and coupled to the third and fourth outer peripheral walls, the third and fourth outer peripheral walls being parallel to one another, the first outer peripheral wall having an outlet port and an inlet port extending outwardly therefrom, the third outer peripheral wall having a first elongated aperture extending therein that fluidly communicates with the inlet port and the interior space, the fourth outer peripheral wall having a second elongated aperture extending therein that fluidly communicates with the outlet port and the interior space, such that the liquid flows through the inlet port and first elongated aperture into the interior space and then the liquid flows from the interior space through the second elongated aperture to the outlet port.

8. A method for assembling a battery cell assembly, the battery cell assembly having a first battery cell with a first side and a second side opposite the first side, a first panel member, and a heat exchanger having a rectangular ring-shaped plastic frame and first and second thermally conductive layers, the rectangular ring-shaped plastic frame having an interior space extending therethrough, the rectangular ring-shaped plastic frame having a third side and a fourth side opposite the third side, the method comprising:
- disposing the first panel member on at least a portion of the first side of the first battery cell;
- disposing the first thermally conductive layer on the third side of the rectangular ring-shaped plastic frame and covering the interior space;
- disposing the second thermally conductive layer on the fourth side of the rectangular ring-shaped plastic frame and covering the interior space; and
- disposing the first battery cell on the first thermally conductive layer of the heat exchanger to obtain the battery cell assembly.

9. The method of claim 8, wherein the battery cell assembly further has a second battery cell having a fifth side and a sixth side opposite the fifth side, the method further comprising disposing the fifth side of the second battery cell on the second thermally conductive layer of the heat exchanger.

10. The method of claim 9, wherein the battery cell assembly further has a second panel member, the method further comprising disposing the sixth side of the second battery cell on the second panel member.

11. The method of claim 8, wherein the first thermally conductive layer is constructed from aluminum.

12. A battery cell assembly, comprising:
- a first battery cell having a first side and a second side opposite the first side;
- a first panel member configured to contact at least a portion of the first side of the first battery cell; and
- a heat exchanger having a peripheral plastic frame and first and second thermally conductive layers, the peripheral plastic frame having an interior space extending therethrough, the peripheral plastic frame having a third side and a fourth side opposite the third side, the first thermally conductive layer being disposed on the third side of the peripheral plastic frame and covering the interior space, the second thermally conductive layer being disposed on the fourth side of the peripheral plastic frame and covering the interior space, the first thermally conductive layer being disposed adjacent the second side of the first battery cell, such that when a liquid is disposed in the interior space, heat energy is transferred from the first battery cell through the first thermally conductive layer to the liquid;
- wherein the peripheral plastic frame has first, second, third and fourth outer peripheral walls, the first and second outer peripheral walls being spaced apart from one another and coupled to the third and fourth outer peripheral walls, the third and fourth outer peripheral walls being spaced apart from one another, the first outer peripheral wall having an outlet port and an inlet port extending outwardly therefrom, the third outer peripheral wall having a first elongated aperture extending therein that fluidly communicates with the inlet port and the interior space, the fourth outer peripheral wall having a second elongated aperture extending therein that fluidly communicates with the outlet port and the interior space, such that the liquid flows through the inlet port and first elongated aperture into the interior space and then the liquid flows from the interior space through the second elongated aperture to the outlet port.

13. The battery cell assembly of claim 12, wherein the heat exchanger further comprises at least one cross-member that extends across the peripheral plastic frame to partition the interior space into at least first and second interior regions.

14. The battery cell assembly of claim 12, wherein the first thermally conductive layer is constructed from aluminum.

15. The battery cell assembly of claim 12, further comprising:
- a second battery cell having a fifth side and a sixth side opposite the fifth side, the fifth side of the second battery cell being disposed on the second thermally conductive layer, such that when the liquid is disposed in the interior space, heat energy is transferred from the second battery cell through the second thermally conductive layer to the liquid.

* * * * *